United States Patent [19]

Blechinger

[11] 4,404,858
[45] Sep. 20, 1983

[54] VELOCITY AND MASS AIR FLOW SENSOR

[75] Inventor: Chester J. Blechinger, Bloomfield Hill, Mich.

[73] Assignee: Ford Motor Company, Dearborn, Mich.

[21] Appl. No.: 315,096

[22] Filed: Oct. 26, 1981

[51] Int. Cl.³ ................ G01F 1/34; G01F 1/32; G01F 1/76

[52] U.S. Cl. .................. 73/861.02; 73/861.22

[58] Field of Search ......... 73/861.02, 861.03, 861.22, 73/861.24, 861.34

[56] References Cited

U.S. PATENT DOCUMENTS

| | | | |
|---|---|---|---|
| 3,173,003 | 3/1965 | Muller-Girard | 73/861.02 |
| 3,650,152 | 3/1972 | White | 73/861.22 |
| 3,719,073 | 3/1973 | Mahon | 73/861.22 |
| 3,729,995 | 5/1973 | Kovacs et al. | 73/861.03 |
| 4,285,246 | 8/1981 | Kita | 73/861.03 |
| 4,297,894 | 11/1981 | Nagaishi | 73/861.03 |

*Primary Examiner*—Herbert Goldstein
*Attorney, Agent, or Firm*—Peter Abolins; Robert D. Sanborn

[57] ABSTRACT

A device for measuring the velocity of fluid includes a vortex generating means, a pressure sensor means and a processing means. The vortex generating means is positioned in the fluid stream so that vortices are formed in the wake of the generating means. The pressure sensor means is positioned in the wake of the generating means for sensing pressure variation caused by the passage of the vortices. The processing means is coupled to the pressure sensor for determining the fluid flow rate as a function of pressure changes sensed by the pressure sensor means.

6 Claims, 2 Drawing Figures

VELOCITY AND MASS AIR FLOW SENSOR

BACKGROUND OF THE INVENTION

1. Field of the Invention

This invention relates to measurement of fluid flow.

2. Prior Art

Various apparatus for the measurement of fluid velocity are known. First, a system for measuring the relative velocity between a body and the contiguous fluid includes an impeller or rotor which is rotatably pivoted on the body immersed in the fluid. Flow of the fluid relative to the body causes the impeller or rotor to rotate with an angular velocity dependent on the relative velocity between the body and the fluid. This rotation may operate, by electrical or mechanical means, an indicator which is suitably calibrated to indicate relative velocity. Disadvantages of such an arrangement include that the angular velocity of the impeller or rotor is not accurately proportional to the relative velocity between the fluid and the body.

An apparatus related to the previously discussed impeller rotor is a vane-like obstruction in the fluid path. The amount of deflection of the vane is proportional to the fluid velocity. Deflection of the vane can be sensed by any of a variety of means such as movement of a slider along a resistance thereby varying the resistance proportional to vane deflection.

Also known are hot wire fluid flow sensors wherein the motion of the fluid past a heated wire cools the wire. The amount of cooling is dependent upon the amount of fluid flowing past the wire. Thus, a hot wire fluid flow sensor can measure the mass of the fluid flowing past the sensor. It is advantageous to know the mass of the air entering an internal combustion engine when establishing an air fuel ratio. The amount of cooling the wire can be determined by a resistance change which can be measured in any number of ways. Disadvantages of such an apparatus include that various impurities in the fluid may be deposited on the wire and cause an erroneous indication of fluid mass flow.

Another method of determining fluid velocity uses an object placed in the fluid flow to create a fluctuating flow of vortices in the wake of the object located in the fluid, i.e., Karman vortices. Alternatively, vanes can be placed in the fluid flow to induce a swirl having a cork screw shape. The passage of the ridges and troughs of the cork screw are an indication of fluid velocity.

It is known that the Karman vortices tend to be formed on the downstream side of the object at regular intervals and alternately, first behind one side edge of the object and then behind the opposite side or edge. The vortices detach themselves from the object in two nearly parallel rows and are carried downstream at a velocity substantially proportional to, but somewhat less than, the relative velocity of the fluid. That is, the vortices have a slip velocity which tends to bear a constant ratio to the velocity of the fluid. It is also well known that in each row the vortices are formed at a distance apart which tends to bear a constant ratio to the size of the object but substantially independent of the relative velocity of the fluid. From these considerations it has been shown that the frequency at which vortices are formed behind either side or edge of a cylinder tends to be proportional to the relative velocity of the fluid and inversely proportional to the size of the cylinder, but to depend substantially upon no other factor or parameter.

The phenomenon of alternate vortex formation in two rows in this way occurs frequently in the natural world, and is known to be the cause of, for example the "singing" of telegraph wires in the wind, the "sighing" and "roaring" of wind in trees, and the "whistling" of wind through tall grasses.

However, reliable, accurate and inexpensive measurement of these vortices to determine fluid flow has presented a problem. For example, U.S. Pat. No. 3,116,639 issued to W. G. Bird teaches positioning a vane like element mounted for oscillatory movement about an axis extending at right angles to the direction of flow of the fluid and positioned downstream of the vortex generator. The frequency of oscillation of the vane like element is measured and is related to the frequency with which vortices pass the element. The response time of such a system is, of course, related to the mechanical response of the system. That is, the vane like element may not be able to respond to the changes in velocity. Further, the strength of the vortices must be sufficiently strong to cause movement of the vane like element.

Another method and apparatus for determining the passage of a vortex is taught in U.S. Pat. No. 3,680,375 issued to R. D. Joy et al. A sonic signal transmitting transducer is located on one side of the wake of vortices and a sonic signal receiving transducer is located on the other side of the wake. The transmitting transducer signal is modulated by the Karman vortices and received by the receiving transducer. An electronic signal detector is connected to the signal receiving transducer for detecting the modulations created by the Karman vortices. Here again, the vortices must be of sufficient magnitude to cause modulation of the sonic signal. Further, modulation of a sonic signal may occur due to disturbances in the fluid flow other than vortices thus causing erroneous signals. Still further, relatively complex electronics is required to properly process modulation of the sonic signal to determine if a vortex has passed. These are some of the problems this invention overcomes.

SUMMARY OF THE INVENTION

In accordance with an embodiment of this invention, a device for measuring the velocity of fluid includes a vortex generating means, a pressure sensor means and processing means. The vortex generating means is positioned in a fluid stream so that vortices are formed in the wake of the generating means. The pressure sensor means is positioned in the wake of the generating means for sensing a pressure variation caused by the passage of the vortices. The processing means is coupled to the pressure sensor means for determining the fluid flow rate as a function of pressure changes sensed by the pressure sensor means.

DETAILED DESCRIPTION OF INVENTION

Figure 1:
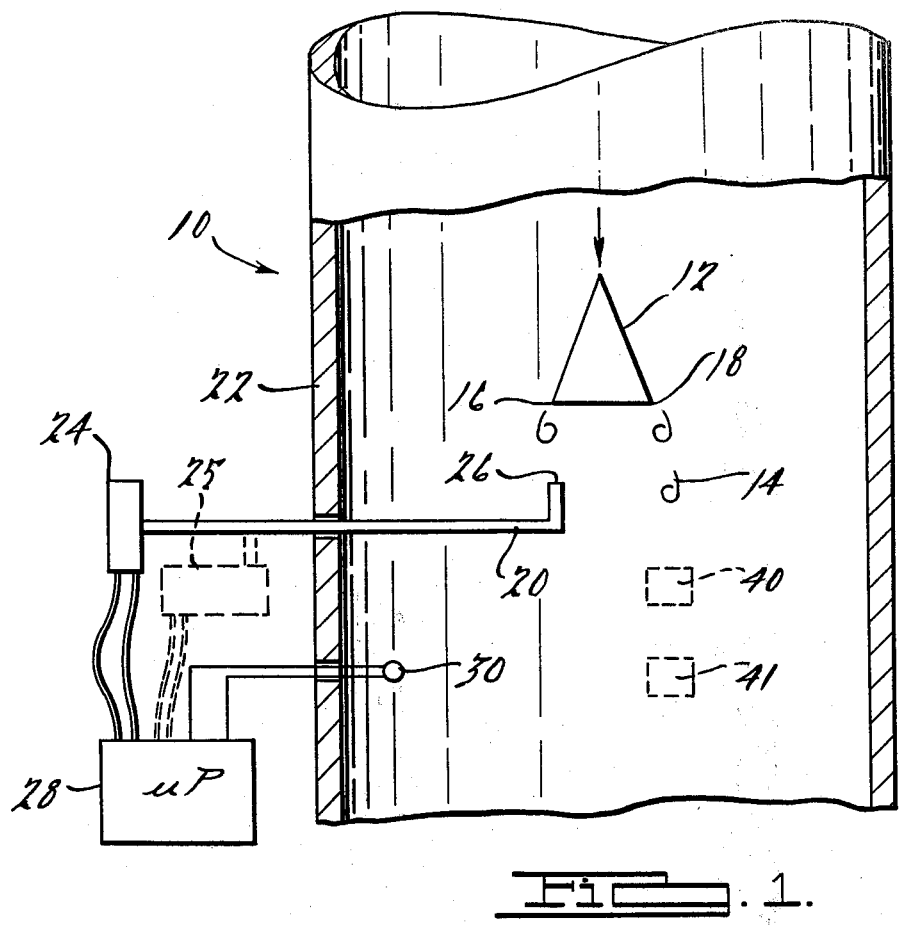
FIG. 1 is a cross section, partly block, view of a velocity and mass air flow sensor in accordance with an embodiment of this invention.

Referring to FIG. 1, a mass air flow sensor 10 includes a vortex generator 12 positioned in the air flow. Vortex generator 12 is generally an elongated member transverse to the direction of air flow and can have any of a number of cross sectional configurations such as the triangular one shown. Vortex generator 12 creates vortices 14 off the two sides 16 and 18 of vortex generator 12. A pitot tube 20 is positioned downstream of vortex generator 12 and is coupled through a wall 22 of mass air flow meter 10 to a pressure transducer 24. Pitot tube 20 is generally a hollow cylinder which conveys pressure variations at the opening 26 of pitot tube 20 to pressure transducer 24. Pressure transducer 24 takes the pressure variation sensed by pitot tube 20 and changes it to electrical signals which are applied to a microprocessor 28. Additionally, a temperature sensor 30 is positioned within wall 22 and coupled to microprocessor 28.

In operation, air flows into cylindrical wall 22 of mass air flow sensor 10 in the direction of the arrow. The air striking vortex generator 12 generates two wakes of vortices. The sequential forming of vortices alternates between side 16 and side 18 so that the vortices in the two streams are staggered. As the vortices approach opening 26 of pitot tube 20, a pressure disturbance takes place. That is, the swirling vortex produces a pressure variation with respect to the background pressure. Vortices can also be produced by a ring of vanes set at an angle to incoming air flow. Air flow downstream of the vanes has a cork screw or tornado like path. The troughs and ridges of the cork screw flow past pitot tube 20 and cause pressure variations.

The pitot tube installation could be one of two types. First, the tube could protrude perpendicular to wall 22 with the plane of the opening parallel to the direction of airflow. Second, as shown in FIG. 1, pitot tube 20 can have a 90° angle so that the plane of the opening is perpendicular to the direction of the airflow. If the orientation of the opening is such that the plane of the opening is parallel to the flow, the pressure observed by the opening will be the sum of the static pressure and the pressure due to the vortex. In the second case, when the opening faces upstream, opening 26 of pitot tube 20 responds to the static pressure, the velocity pressure (sometimes called dynamic pressure), the turbulence pressure fluctuations and the pressure pulsations due to the passing vortices. As used herein, the background pressure includes the static pressure, the velocity pressure and the turbulence pressure fluctuations. However, the pressure pulsations due to the vortices are frequency pulsations in addition to the background pressure. The background pressure is largely influenced by the "system pressure" for a closed system whose static pressure can be adjusted as desired. If the system is an open system taking air from the atmosphere, then the barometric or ambient pressure has a large effect.

Figure 2:
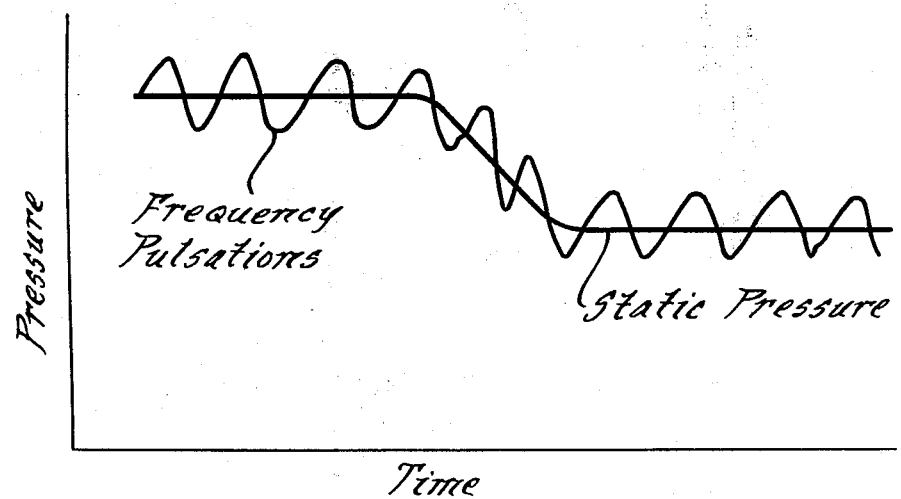
FIG. 2 is a graphical representation of pressure versus time of the pressure sensed by the pressure sensing means of FIG. 1 and shows a background pressure with frequency pulsations superimposed thereon indicative of passing vortices.

Referring to FIG. 2, a background pressure line with respect to time is shown. The variation of the background pressure may be due to such things as changing altitude. An oscillating pressure variation superimposed on the background pressure line indicates the occurrence of a pressure disturbance in the air flow. This pressure disturbance is due to a vortex adjacent to opening 26 of pitot tube 20.

The pressure variation is transmitted along pitot tube 20 to pressure transducer 24 which produces electrical signals in response to both the background pressure and the superimposed frequency pulsations indicative of passing vortices. The electrical signal is coupled from transducer 24 to microprocessor 28 wherein the signal is processed to provide the separate indication of the background pressure used in density calculations and the frequency of vortex shedding that is a velocity signal. That is, it is possible to compute just the velocity of the air flow or to compute the mass of the air flow when background pressure and fluid temperature are taken into account.

The separate indication of the background pressure used in density calculations and the frequency of vortex shedding can also be obtained by placing a "tee" in the tubing carrying the signal from the pitot tube and connecting a slow response pressure sensor to one side of the "tee" to get the background pressure and a microphone to the other side of the "tee" to get the vortex frequency which is proportional to the velocity, both of which provide the two separate electrical signals to the microprocessor 28. Referring to FIG. 1, a slow response pressure sensor 25 is shown in dotted outline connected to a leg of a "tee" of pitot tube 20. In such a combination, pressure transducer 24 has a relatively fast response to determine vortex frequency. When controlling air fuel ratios for internal combustion engines it is often desirable to know the mass flow, which is calculated from the equation

| | | |
|---|---|---|
| m | = ρA V | |
| m | = mass flow rate | kg/s |
| ρ | = density | kg/m$^3$ |
| A | = cross sectional area | m$^2$ |
| V | = velocity | m/s |

The density is independent of pressure for incompressible fluids such as water, but dependent upon pressure, P, and temperature, T, for gases such as air, according to the equation.

$$\rho = \frac{P}{RT}$$

wherein R is a proportionality constant.

The pressure term used in the above equation is the background pressure obtained from microprocessor 28 by processing the electrical signal from transducer 24 or from slow response pressure sensor 25 which directly provides an electrical signal proportional to the background static pressure. A temperature sensor 30 can provide an electrical signal indicative of temperature to microprocessor 28. This temperature information can be incorporated in the calculation performed by microprocessor 28 to determine the mass of air flowing through mass air flow sensor 10.

If desired, a pressure transducer such as a microphone can be placed in the air flow stream downstream of vortex generator 12 and the pitot tube eliminated (see 40 of FIG. 1). Further, if desired, two pressure transducers or sensors (e.g., pitot tubes or microphones) can be placed downstream of the vortex generator (see 40 and 41 of FIG. 1). The two pressure transducers are advantageously in line with one another along the flow of the air and spaced from one another. Such an arrangement provides for a more accurate determination of the back ground pressure and increased sensitivity for detection of individual vortices. The pressure variations sensed by the two pressure sensors would be applied to the microprocessor which is capable of processing the information.

Various modifications and variations will no doubt occur to those skilled in the various arts to which this invention pertains. For example, the particular positioning of the pressure sensor downstream of the vortex generator may be varied from that disclosed herein. These and all variations which basically rely on the teachings through which this disclosure has advanced the art are properly considered within the scope of this invention.

I claim:

1. A device for measuring the velocity of a fluid comprising:
   vortex generating means positioned in a fluid stream so that vortices are formed in the wake of said generating means;
   pressure sensor means positioned in the wake of said generating means for sensing a pressure variation caused by the passage of the vortices;
   processing means coupled to said pressure sensor means for determining the fluid flow rate as a function of pressure changes sensed by said pressure sensor means; and
   said pressure sensor means comprising two pressure sensing locations spaced apart and aligned generally along the direction of fluid flow thereby improving detection of pressure variations due to passing vortices.

2. A device for measuring the velocity of a fluid comprising:
   vortex generating means positioned in a fluid stream so that vortices are formed in the wake of said generating means;
   pressure sensor means positioned in the wake of said generating means for sensing a pressure variation caused by the passage of the vortices;
   processing means coupled to said pressure sensor means for determining the fluid flow rate as a function of pressure changes sensed by said pressure sensor means; and
   said pressure sensor means includes a pitot tube having
   a pressure head positioned in the wake of said vortex generating means;
   a tee with a first and a second leg coupled to said pressure head;
   said first leg being coupled to a relatively slow response pressure sensor to get a background pressure;
   said second leg being coupled to a relatively fast response pressure sensor to get the vortex frequency which is proportional to the velocity; and
   said processing means including a microprocessor coupled to receive signals from said fast and slow pressure sensors for use in computations of mass air flow.

3. A device for measuring mass fluid flow comprising:
   vortex generating means positioned in a fluid stream so that vortices are formed in the wake of said generating means;
   pressure sensor means positioned in the wake of said generating means for sensing a pressure variation caused by the passage of the vortices and for sensing average background pressure;
   a temperature sensor means positioned in the fluid stream for providing a signal indicative of the temperature of the fluid stream; and
   a processing means coupled to said pressure sensor means and said temperature sensor means for determining the mass fluid flow as a function of pressure changes and average pressure sensed by said pressure sensor means and temperature sensed by said temperature sensor means.

4. A device for measuring mass fluid flow as recited in claim 3 wherein said vortex generating means is generally elongated and extends perpendicular to the direction of fluid flow so as to generate Karman vortices.

5. A device for measuring mass fluid flow as recited in claim 4 wherein said pressure sensor means includes a pitot tube having a pressure head positioned in the wake of said vortex generating means.

6. A device for measuring mass fluid flow as recited in claim 5 wherein:
   said pitot tube has a tee with a first and a second leg coupled to said pressure head;
   said pressure sensor means includes a first pressure transducer having a relatively slow response time to provide a signal indicative of a background pressure and a second pressure transducer having a relatively fast response time to get the vortex frequency which is proportional to the velocity;
   said first leg being coupled to said relatively slow response pressure transducer and said second leg being coupled to said relatively fast response transducer; and
   said processing means including a microprocessor coupled to receive signals from said fast and slow pressure transducers for use in computations of mass air flow.

* * * * *